April 17, 1928. 1,666,767
A. L. KRONQUEST
SOLDERING MACHINE
Filed Feb. 18, 1927  3 Sheets-Sheet 1
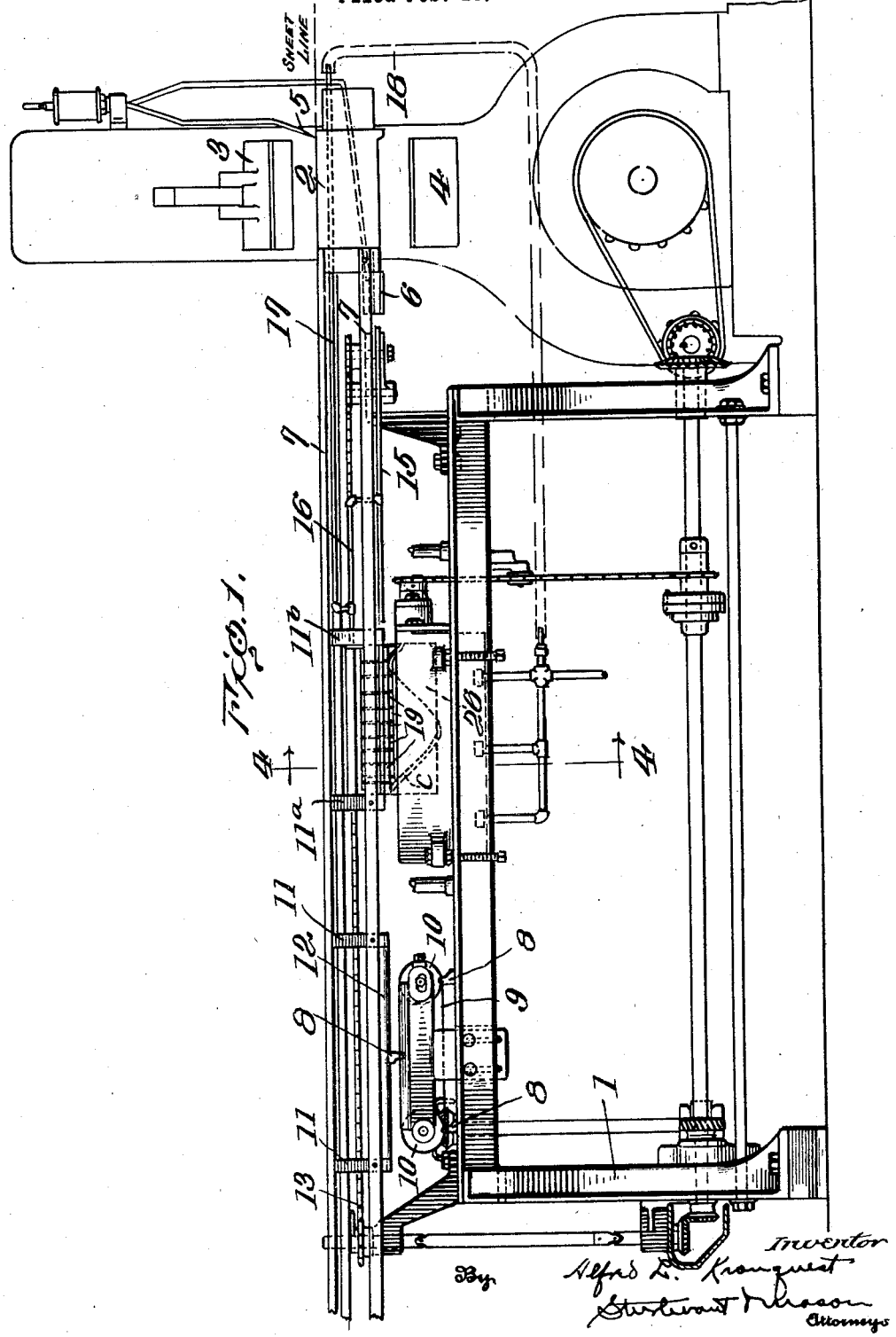

April 17, 1928.  1,666,707
A. L. KRONQUEST
SOLDERING MACHINE
Filed Feb. 18, 1927   3 Sheets-Sheet 3
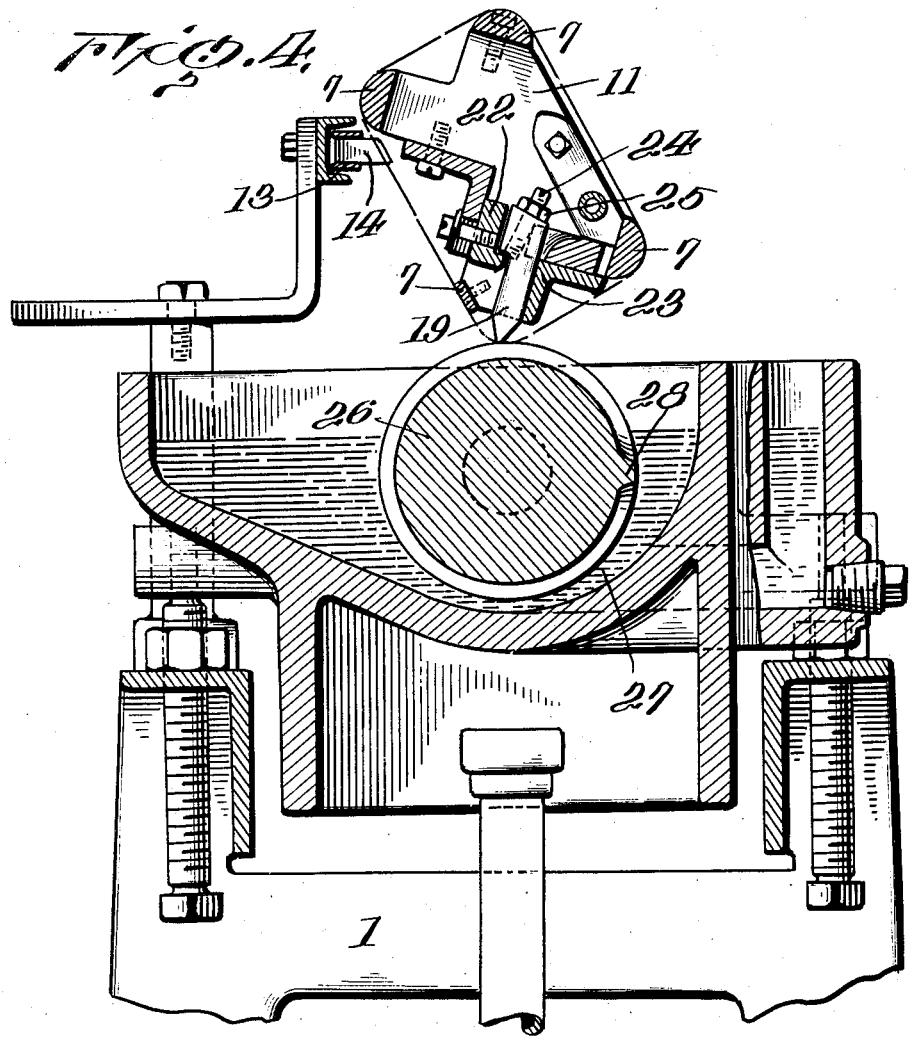
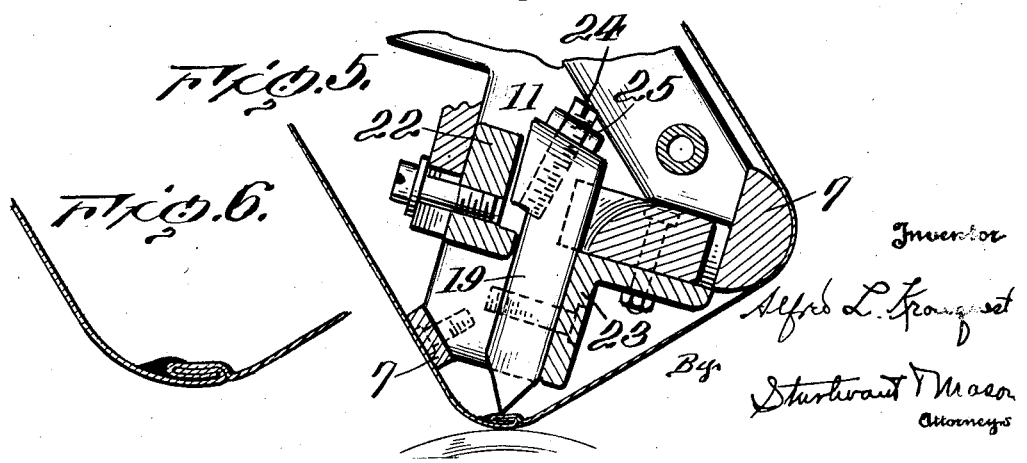

Patented Apr. 17, 1928.

1,666,707

UNITED STATES PATENT OFFICE.

ALFRED L. KRONQUEST, OF CHICAGO, ILLINOIS, ASSIGNOR TO CONTINENTAL CAN COMPANY, INC., OF NEW YORK, N. Y., A CORPORATION OF NEW YORK.

SOLDERING MACHINE.

Application filed February 18, 1927. Serial No. 169,250.

The invention relates to new and useful improvements in soldering machines, for soldering the side seam of can bodies.

An object of the invention is to provide a soldering machine wherein the can body to be soldered is passed over a series of soldering irons and the solder applied to the side seam on the inside of the can body.

A further object of the invention is to provide a machine of the above type wherein the soldering irons are supplied with solder at the interval between the passing can bodies.

A still further object of the invention is to provide a machine of the above type wherein the soldering irons are supplied with solder by means of a roll rotating in the bath of molten solder, and provided with a spiral rib or thread of such a pitch that the can body which is to be soldered is shorter in length than the distance between adjacent turns in the thread on the roll.

A still further object of the invention is to provide a machine of the above type wherein the soldering irons are yieldingly mounted and are considerably shorter in length than the interval between the can bodies passing through the soldering machine.

These and other objects will in part be obvious and will in part be hereinafter more fully disclosed.

In the drawings which show by way of illustration one embodiment of the invention—

Figure 1 is a side view of a soldering machine embodying my improvements;

Fig. 4 is a sectional view transversely through the solder bath and the support for the soldering irons, on the line 4—4 of Fig. 1;

Fig. 5 is an enlarged view showing a portion of the soldering horse, the soldering irons, and a can body which is being soldered, and Fig. 6 is an enlarged sectional view of a portion of the can body showing the side seam soldered.

Figure 3:
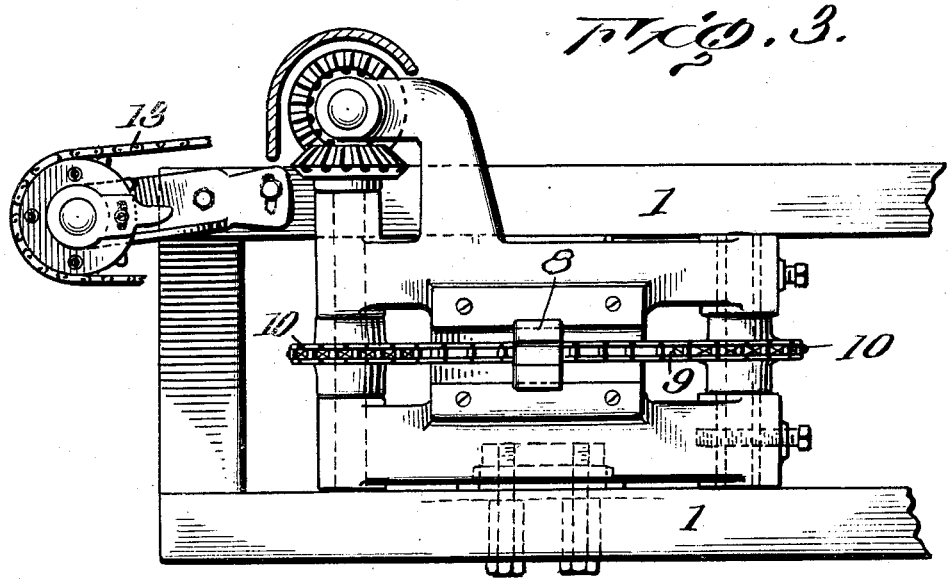
Fig. 3 is a plan view of a portion of the machine where the outer or free end of the soldering horse is supported.

The invention is directed broadly to a soldering machine for soldering the side seam of a can body, which may be either square or round. The can body, after it is formed, is moved along the inside soldering horse, which extends through the can body. The side seam is pre-heated in any suitable way, and then the can body passes over a series of soldering irons so that these irons pass through the body. The irons are independently mounted, and are capable of yielding. They are so supported, that as they pass through the can body they will make contact with the side seam on the inside of the can body and apply solder thereto. The solder is supplied to these soldering irons at the interval between the passing can bodies. This is accomplished by means of a roll which extends parallel with the path of travel of the can bodies and is located beneath the same. The roll is provided with a spiral lead or thread. This roll rotates in a bath of molten solder. Only the lower portion of the roll is immersed in the solder, and therefore, this thread or lead will take up a film of solder on its outer face, and is used to present the solder to the soldering irons. The thread on this roll is of such a pitch that the distance between adjacent turns in the thread is greater than the length of the can body being soldered. It is timed so that the can body is moved along the inside horse and over the soldering irons without making contact with the thread or lead. Therefore, the thread or lead can make contact with the soldering irons in the space between passing can bodies. This thead will engage one iron after another, and thus it is that the solder is applied to the irons.

Referring more in detail to the drawings, my improved soldering machine consists of a supporting frame 1 which may be of any desired construction. At the right-hand end of this frame as viewed in Fig. 1, there is a horn 2, around which the can body is formed. Folding wings 3 are used for folding the body around the horn, and when a lock and lap seam body is formed, a bumper 4 is used for bumping the seam. The sheet to form the can body is fed into the machine from the right-hand end as viewed in Fig. 1, and along the line called "sheet line". As it passes beneath the pipe 5, flux will be applied to the edge which is to be formed into the side seam and soldered. The interlocked edges are also brought into engagement with a fluxing pad 6. In line with the horn 2 is an inside soldering horse which includes a series of guide rails 7, 7. These guide rails are secured to the horn at the receiving end of the soldering horse. They extend the full length of the machine, and are supported at the other end thereof by a series of traveling devices 8, 8. These traveling devices are carried by an endless chain 9 running about sprocket wheels 10, 10. The inside horse is provided with a series of blocks 11 which hold the guide rails in proper spaced relation to each other. Attached to two of these blocks is a rod 12. The support 8 engages the rod and moves along the rod, and while moving along the rod, supports the outer or free end of the soldering horse. These traveling supports 8 are a sufficient distance apart, and are timed so that the horse is engaged at the interval between passing can bodies. The can bodies are moved along the inside horse by a traveling conveyor 13, which is provided with suitable fingers 14 adapted to engage a can and slide it along the horse.

A burner pipe 15 is attached to a supply pipe 16 located within the inside horse, and this pipe 16 connects with another supply pipe 17 which extends lengthwise of the horse and through the horn, where it connects with a pipe 18. This burner pipe is inside the can body, and the can body slides over the same. This enables the heating flame to be applied to the inside seam as it slides along the inside horse.

Figure 2:
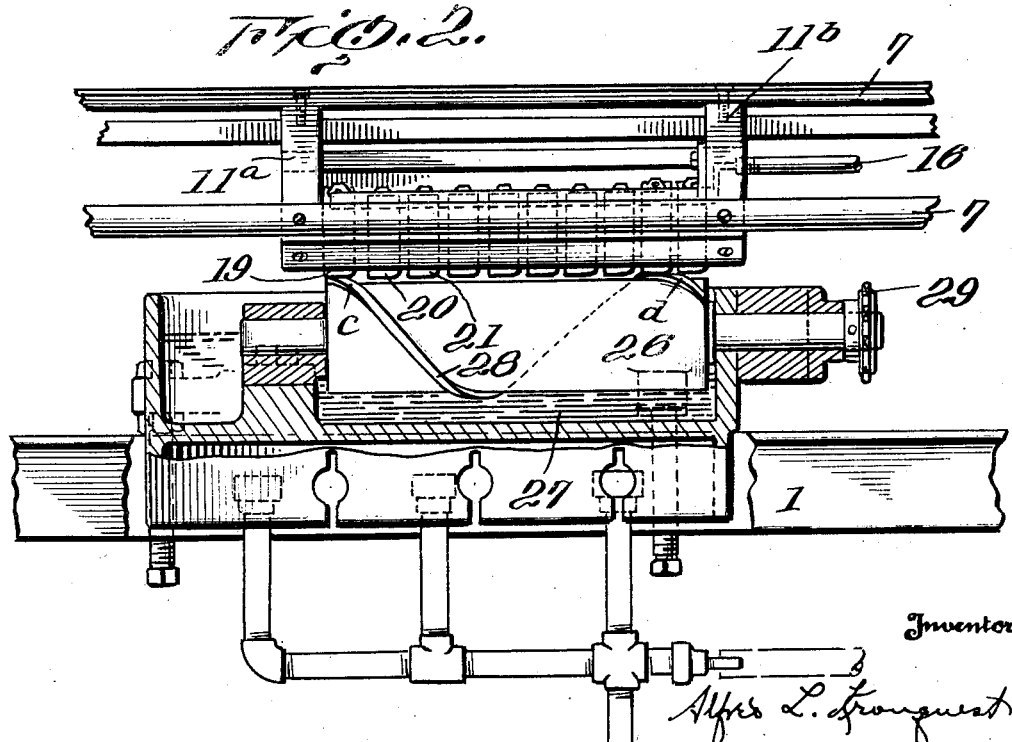
Fig. 2 is an enlarged side view of the machine in the region of the soldering irons and solder bath.

Solder is applied to the inside seam by a series of soldering irons indicated at 19, 20, 21, etc., in Fig. 2 of the drawings. The section of the inside horse between the blocks 11ª and 11ᵇ is provided with a support for the soldering irons. This support consists of an adjustable bar 22 and a combined guiding and supporting bar 23. Each soldering iron is provided with an adjustable stop screw 24 and a lock nut 25 which holds the stop screw in a set position. The soldering iron is free to move up and down on the guide and support 23 therefor. As noted, each soldering iron is independent of the others, and therefore, they are freely independently yieldable. The forward end of each iron is slightly curved. These irons are placed close to each other and are very much narrower in width than the length of the can body being soldered. In fact, they are narrower in width than the space between successive can bodies passing through the machine. As shown in Fig. 2 of the drawings, there are ten soldering irons. Directly beneath these soldering irons is a roll 26 which rotates in a bath of molten solder indicated at 27. This roll is provided with a spiral thread or lead 28. The pitch of this thread or lead is such that the distance between the turn $c$ in the thread and the turn $d$ in the thread is greater than the length of a can body. The roll is timed so that the can body as it passes through the machine will lie between adjacent turns in the thread as it passes over the roll 26. This thread or lead running as it does in the molten solder bath, will take up a film of solder. The thread or lead will engage the solder irons in turn, one after the other, and will raise the soldering irons slightly, supplying each iron in turn with solder. While the iron is raised, the can body may be started in its movement underneath the iron, or the iron may drop until it is supported by this stop, and when the body moves beneath the same, it will raise the iron, so that the iron will make running contact with the inside of the seam from one end thereof to the other. Thus it is that the irons, in succession, making contact with the side seam, will supply the side seam with molten solder.

The roll 26 is rotated in the solder bath by a suitable sprocket wheel 29 and a driving sprocket therefor. The solder bath is mounted for adjustment vertically and may be heated by suitable burners.

From the above it will be apparent that I have provided a soldering machine wherein a series of soldering irons are used for supplying solder to the side seam of a can body at the inside thereof. This produces a machine which is very useful in soldering decorated or lithographed cans. Prior to the construction of my soldering machine, the usual method of soldering decorated or lithographed cans has been by the use of a hand iron. Furthermore, by the use of my improved soldering machine, the cans will be subjected to exactly the same heat and soldering conditions, and therefore, the machine can be so regulated as to avoid scorching of the decoration and the cost of operation greatly reduced.

It is not thought necessary to describe more in detail the parts of the machine which have to do with the supporting and conveying of the can bodies, as this structure may be greatly modified without departing from the spirit of the invention as set forth in the appended claims, which are directed to the means for applying the solder to the inside of the can body for soldering the side seam thereof.

Having thus described the invention, what

I claim as new and desire to secure by Letters-Patent, is—

1. A soldering machine for metal can bodies comprising an inside supporting horse along which the can bodies to be soldered are moved, a series of soldering irons yieldingly mounted on said horse, and over which the can bodies pass, said irons successively engaging the side seam of the can body at the inside thereof, and means engaging the soldering irons at the face making contact with the side seam for supplying said irons with solder during the interval between the passing can bodies.

2. A soldering machine for metal can bodies comprising an inside supporting horse along which the can bodies to be soldered are moved, a series of soldering irons yieldingly mounted on said horse, and over which the can bodies pass, said irons successively engaging the side seam of the can body, means for supplying said irons with solder during the interval between the passing can bodies, said means including a solder bath, a roll mounted in said solder bath, and having its longitudinal axis disposed lengthwise of said soldering horse, and means carried by said roll for taking up the solder from said bath and applying the same to the soldering irons.

3. A soldering machine for metal can bodies comprising an inside supporting horse along which the can bodies to be soldered are moved, a series of soldering irons yieldingly mounted on said horse, and over which the can bodies pass, said irons successively engaging the side seam of the can body at the inside thereof, means engaging the soldering irons in succession at the face thereof making contact with the seam for supplying said irons with solder during the interval between the passing can bodies, said soldering irons being supported by said soldering horse so as to move by gravity into engagement with the side seam of the can body, and stops for limiting the downward movement of said irons when they are out of contact with the can body.

4. A soldering machine for metal can bodies comprising an inside supporting horse along which the can bodies to be soldered are moved, a series of soldering irons yieldingly mounted on said horse, and over which the can bodies pass, said irons successively engaging the side seam of the can body, means for supplying said irons with solder during the interval between the passing can bodies, said means including a solder bath, a roll mounted in said solder bath and having its longitudinal axis disposed lengthwise of said soldering horse, and a spiral thread formed on said roll adapted to engage said soldering irons in succession for supplying solder thereto.

5. A soldering machine for metal can bodies comprising an inside supporting horse along which the can bodies to be soldered are moved, a series of soldering irons yieldingly mounted on said horse and over which the can bodies pass, said irons successively engaging the side seam of the can body, means for supplying said irons with solder during the interval between the passing can bodies, said means including a solder bath, a roll mounted in said solder bath and having its longitudinal axis disposed lengthwise of said soldering horse, and a spiral thread formed on said roll adapted to engage said soldering irons in succession for supplying solder thereto, the width of said thread being very much less than the width of the individual soldering irons, and the distance between the turns on the thread being greater than the length of the can being soldered.

6. A soldering machine for metal can bodies comprising an inside supporting horse along which the can bodies to be soldered are moved, a series of soldering irons yieldingly mounted on said horse and over which the can bodies pass, said irons successively engaging the side seam of the can body, means for supplying said irons with solder during the interval between the passing can bodies, said means including a solder bath, a roll mounted in said solder bath and having its longitudinal axis disposed lengthwise of said soldering horse, and a spiral thread formed on said roll adapted to engage said soldering irons in succession for supplying solder thereto, the width of said thread being very much less than the width of the individual soldering irons, and the distance between the turns on the thread being greater than the length of the can being soldered, said roll being timed so that the can body being soldered is in the space between the turns of the thread on said roll as it passes along the roll.

7. A soldering machine for soldering the side seams of can bodies comprising an inside supporting horse along which the can bodies to be soldered are moved, a series of soldering irons located in a line lengthwise of the soldering horse and supported so as to move vertically thereon, stops for limiting the downward movement of said soldering irons, said soldering irons being positioned so as to engage in succession the side seam of the can bodies on the inside of the bodies as the can bodies pass over the irons, and means for engaging said irons at the interval between the passing can bodies for supplying solder thereto.

8. A soldering machine for soldering the side seams of can bodies comprising an inside supporting horse along which the can bodies to be soldered are moved, a series of soldering irons located in a line lengthwise of the soldering horse and supported so as to move vertically thereon, stops for limiting the downward movement of said soldering irons, said soldering irons being positioned so as to engage in succession in the side seam of the can bodies on the inside of the bodies as the can bodies pass over the irons, means for engaging said irons at the interval between the passing can bodies for supplying solder thereto, said last-named means including a solder bath, a roll rotating in said solder bath, and a spiral thread on said roll adapted to engage and supply solder to the soldering irons.

In testimony whereof, I affix my signature.

ALFRED L. KRONQUEST.